(12) United States Patent
Harada et al.

(10) Patent No.: US 10,447,139 B2
(45) Date of Patent: Oct. 15, 2019

(54) LOAD DRIVING APPARATUS

(71) Applicant: DENSO CORPORATION, Kariya, Aichi-pref. (JP)

(72) Inventors: Yasuhiko Harada, Kariya (JP); Mitsuru Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 15/701,661

(22) Filed: Sep. 12, 2017

(65) Prior Publication Data

US 2018/0076703 A1  Mar. 15, 2018

(30) Foreign Application Priority Data

Sep. 15, 2016  (JP) ................. 2016-180476

(51) Int. Cl.
| | | |
|---|---|---|
| *H03B 1/00* | (2006.01) | |
| *H03K 3/00* | (2006.01) | |
| *H02M 1/08* | (2006.01) | |
| *H02M 3/156* | (2006.01) | |
| *H02P 8/12* | (2006.01) | |
| *H02M 3/158* | (2006.01) | |
| *H02M 1/00* | (2006.01) | |
| *H02M 3/155* | (2006.01) | |

(52) U.S. Cl.
CPC ............ *H02M 1/08* (2013.01); *H02M 3/156* (2013.01); *H02M 3/158* (2013.01); *H02P 8/12* (2013.01); *H02M 2001/0009* (2013.01); *H02M 2003/1555* (2013.01)

(58) Field of Classification Search
CPC ................................. H02M 1/08; H02M 3/156
USPC .......................................................... 327/109
See application file for complete search history.

(56) References Cited

U.S. PATENT DOCUMENTS 7,262,588 B2 *  8/2007  Matsuo ............... H02M 3/1584
                                                       323/282

FOREIGN PATENT DOCUMENTS

JP            2004-350386 A     12/2004

* cited by examiner

*Primary Examiner* — Metasebia T Retebo
(74) *Attorney, Agent, or Firm* — Posz Law Group, PLC

(57) ABSTRACT

A load driving apparatus supplies an electric power to a load via a full-bridge circuit. The load driving apparatus detects a load current by a current sensing resistor. A controller in the load driving apparatus generates a drive signal by switching between a first reference circuit outputting a first reference signal with a first reference cycle and a second reference signal outputting a second reference signal with a second reference cycle. A calculator in the load driving apparatus is used to supply a drive signal to the full-bridge circuit for supplying power to the load. When the controller 13 detects that the value of the load current is not reaching predetermined current threshold values, within either of the first reference cycle or the second reference cycle due to temperature fluctuations, the controller switches to either the first reference circuit or the second reference circuit to stabilize the value of the load current around an average value.

7 Claims, 7 Drawing Sheets

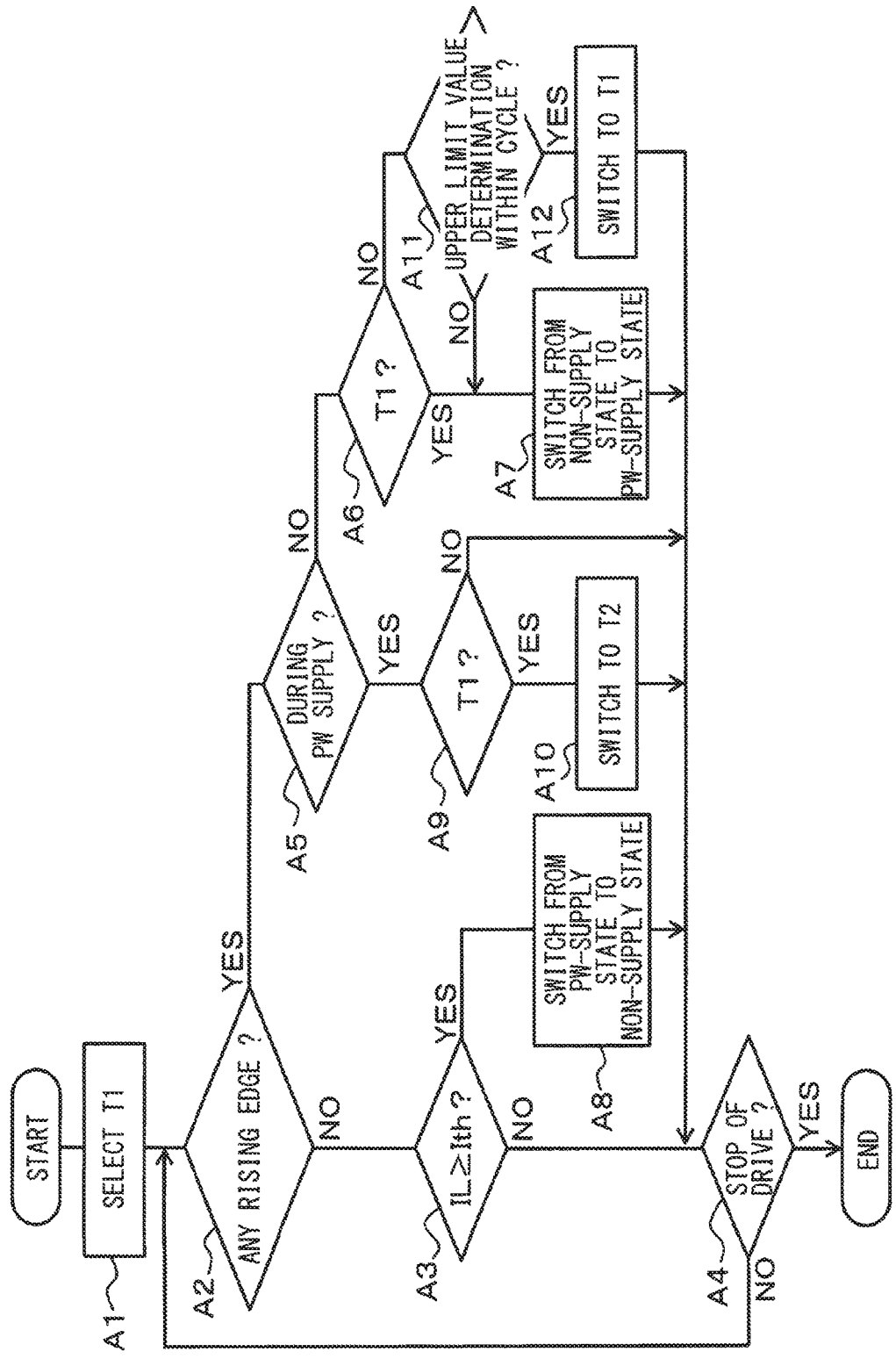

1ST STANDARD
CYCLE SIGNAL S1

2ND STANDARD
CYCLE SIGNAL S2

DRIVE SIGNAL Sd

LOAD CURRENT IL

1ST STANDARD CYCLE SIGNAL S1

2ND STANDARD CYCLE SIGNAL S2

DRIVE SIGNAL Sd

LOAD CURRENT IL

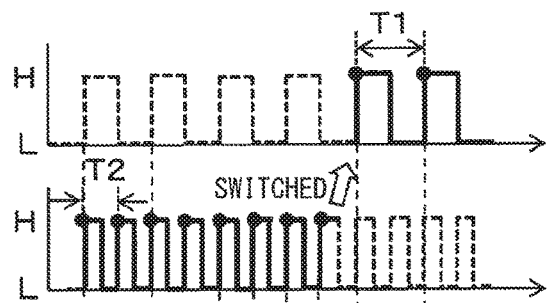
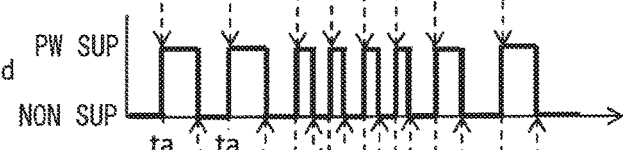
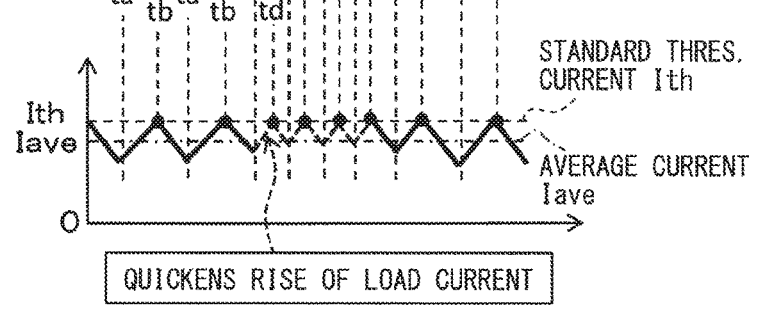

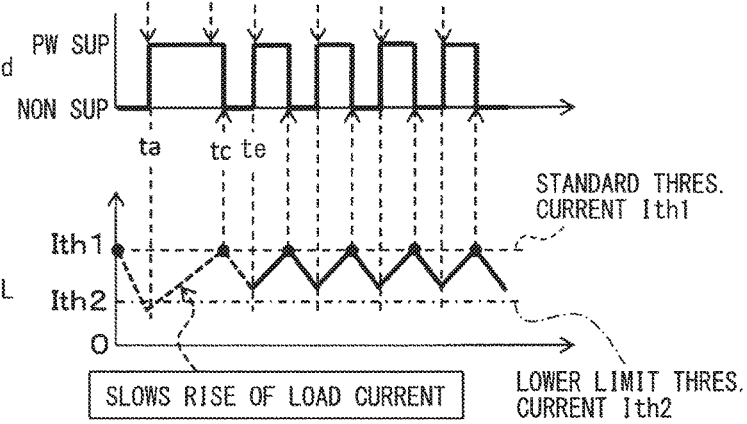

LOAD DRIVING APPARATUS

CROSS REFERENCE TO RELATED APPLICATION

The present application is based on and claims the benefit of priority of Japanese Patent Application No. 2016-180476, filed on Sep. 15, 2016, the disclosure of which is incorporated herein by reference.

TECHNICAL FIELD

The present disclosure generally relates to a load driving apparatus.

BACKGROUND INFORMATION

Methods of controlling an electrical current to an inductive load such as a stepper motor are known. One such method for keeping a current at a constant level includes switching a power supply from an ON state (i.e., to supply power) to an OFF state (i.e., to cut the supply of power) based on a predetermined current threshold and a reference signal. By using such a method, the magnitude and cycle of the load current are kept constant, thereby enabling stable control of motor operation and reducing the possibility of the motor falling out of synchronization.

In harsh environments such as vehicle compartments, for example enclosed compartments or compartments in and around the engine bay where large temperature fluctuations may occur, the characteristics of the motor (i.e., load) may change based on temperature fluctuations. In such cases, a rise in temperature increases the resistance of the load and slows the rise and fall of the load current waveform, i.e. the wave formed by measured current values as a function of time. Likewise, a drop in temperature decreases the resistance of the load and quickens the rise and fall of the load current waveform. Changes in the load current cycle affect the timing of the threshold current detection which is based on the reference signal. As such, current detection timing based on the reference signal can be delayed such that the timing of the power supply switching (i.e. switching between ON and OFF states) can be delayed by one cycle. As a result, to stabilize motor control operation when current detection and load characteristics are affected by a rise in temperature, as described above, the output drive signal is twice as long as the reference drive signal. As such, the drive signal to signal the supply of power to a load affected by rising temperature levels is longer (e.g., twice as long) than the reference signal that determines the drive signal, which may cause a sub-harmonic oscillation of the drive signal when the reference signal ratio is above 50% and lowering the actual load current below a target value, thereby causing an unstable operation of the load.

In view of the above, an output voltage waveform is detected by a detector using motor phase detection (i.e., a phase detector) or an A/D converter, and a change of load characteristics due to temperature fluctuation is determined by detected waveform information (i.e., of the detected waveform), and the drive signal (i.e., a magnitude of the electric current and its frequency) is controlled accordingly. However, in such configuration, an appropriate feedback control may only be performable by using a microcomputer based on the A/D converter and the waveform information, as described in a patent document 1 listed below. Such configurations of the load driving apparatus are complex and expensive.

(Patent document 1) Japanese Patent Laid-Open No. 2004-350386

SUMMARY

It is an object of the present disclosure to provide a load driving apparatus that can change a cycle of the load current without using a complex circuit configuration, to accurately drive the load and prevent deterioration of load control accuracy.

In an aspect of the present disclosure, the load driving apparatus includes: a driver circuit disposed in a power supply path to a load and configured to supply power to the load; a current detector configured to detect a load current; a switch configured to switch between a first reference circuit configured to output a first reference signal with a first reference cycle and a second reference circuit configured to output a second reference signal with a second reference cycle; and a controller configured to (i) control a supply of an electric power from the driver circuit to the load using either of the first reference signal or the second reference signal, and (ii) either (a) stop the supply of the electric power from the driver circuit to the load or (b) supply a reverse current from the driver circuit to the load when the value of the load current detected by the current detector is equal to or greater than a value of a predetermined threshold current, in which the controller is further configured to control the switch and switch between the first reference circuit and the second reference circuit based on a rising value of the load current detected by the current detector.

According to the above-described configuration, the controller supplies electric power to the load based on the phase of either the first reference cycle or the second reference cycle, and stops supplying electric power from the driver circuit or supplies a reverse current from the driver circuit when the load current detected by the current detector takes a value that is equal to or greater than a predetermined threshold current.

The controller conducts the cycle switching by using the switch based on a rising value of the load current that is detected by the current detector.

In such manner, even when a rise speed of the load current value changes due temperature fluctuations affecting the resistance characteristics of conductors in the load, the drive control of the load can be performed at an appropriate cycle, i.e. by the ON and OFF switching of the power supply, thereby preventing large fluctuations of the load current value from an average current value.

BRIEF DESCRIPTION OF THE DRAWINGS

Objects, features, and advantages of the present disclosure will become more apparent from the following detailed description made with reference to the accompanying drawings, in which:

FIG. 2 illustrates a flowchart of a power supply control in the first embodiment of the present disclosure;

FIG. 5A illustrates a timing diagram of a first reference signal;

FIG. 5B illustrates a timing diagram of a second reference signal;

FIG. 5C illustrates a timing diagram of a drive signal;

FIG. 5D illustrates a timing diagram of a load current waveform;

FIG. 7A illustrates a timing diagram of a first reference signal;

FIG. 7B illustrates a timing diagram of a second reference signal;

FIG. 7C illustrates a timing diagram of a drive signal; and

FIG. 7D illustrates a timing diagram of a load current waveform.

DETAILED DESCRIPTION

First Embodiment

Figure 1:
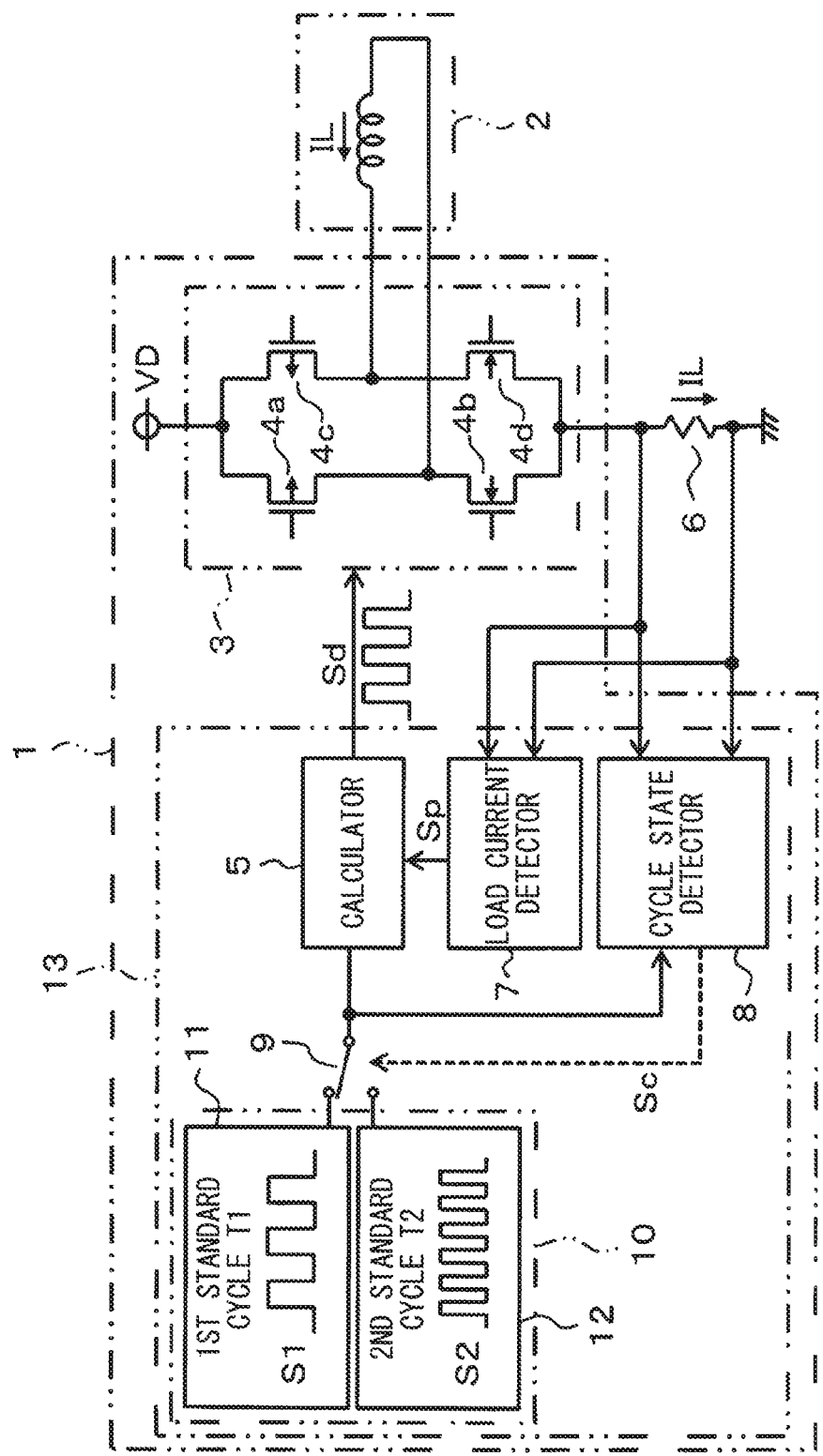
FIG. 1 illustrates a block diagram of an electric circuit in a first embodiment of the present disclosure.

Hereafter, the first embodiment of the present disclosure is described with reference to FIGS. 1-3A-3D.

A load driving apparatus 1 drives an inductive load 2, which may be a stepper motor that has windings or like electromagnetic coils as a main component. The load driving apparatus 1 drives the inductive load 2 by supplying the inductive load 2 with a bi-directional current by switching the direction of current flow to provide a bi-directional current with a constant average current value to the motor.

The load driving apparatus 1 is configured to supply an electric current to both of two terminals of the load 2 from a full-bridge circuit 3 in a switching manner, i.e., the load driving apparatus 1 "switches" the direction of electric current by producing an electric current that flows in a forward and reverse direction.

The full-bridge circuit 3 acts as a drive circuit and has p-channel type MOSFETs 4a and 4c on the high side and n-channel type MOSFETs 4b and 4d on the low side to provide a full-bridge connection.

For each of the MOSFETs 4a-4d of the full-bridge circuit 3, a calculator 5 provides a gate drive signal Sd. An electric current flowing in the full-bridge circuit 3, i.e., a load current IL, is detected by providing a series connection of a current sensing resistor 6 to a ground potential. The current sensing resistor 6 or current sense resistor 6 may be a shunt resistor used to measure current values.

The terminal voltage of the current sensing resistor 6 is detected by a load current detector 7, and the load current detector 7 outputs a detection signal Sp to the calculator 5 when the value of the detected load current IL is equal to or greater than a value of a predetermined threshold current Ith, indicating that an upper limit value of the load current IL is detected.

The terminal voltage of the current sensing resistor 6 is also input to a cycle state detector 8, and the cycle state detector 8 outputs a switch signal Sc to a switch 9 that serves as a cycle switching device for switching between reference circuits outputting reference signals having different reference cycles.

The switch 9 switches based on a switch signal Sc from the cycle state detector 8 to change an output signal from a cycle setter 10.

The cycle setter 10 includes a first reference signal circuit 11 and a second reference signal circuit 12. The first reference signal circuit 11 outputs a rectangular wave signal having a first reference cycle T1 as a first reference signal S1. As used herein, the reference signals described herein may be rectangular or square wave signals having a constant period or cycle. Stated another way, the reference signals may have a constant frequency. The second reference signal circuit 12 outputs a rectangular wave signal having a second reference cycle T2, i.e., one half of the first reference cycle T1 (=T1/2) as a second reference signal S2. In other words, the second reference cycle T2 is twice the frequency as the first reference cycle T1. As described above, the switch 9 is configured to receive the switch signal Sc, and based on the switch signal Sc, can switch between the first reference signal circuit 11 and the second reference signal circuit 12, to vary the output signal of the cycle setter 10. That is, based on the position of the switch 9, the cycle setter 10 either outputs the first reference signal S1 or the second reference signal S2 to the calculator 5 and the cycle state detector 8. Parts of the load driving apparatus 1, excluding the full-bridge circuit 3, are designated as a controller 13. The controller 13 controls the operation of the load driving apparatus 1.

Next, with reference to FIG. 2 to FIG. 5A-5D, the operation of the above-mentioned configuration is described.

FIG. 2 is a flowchart of the operation of the load driving apparatus 1.

FIGS. 3A-3D, 4A-4D, 5A-5D, and 7A-7D illustrate timing diagrams of signals and current output or measured during the operation of the load driving apparatus 1. The horizontal axis of each timing diagram represents an increase in time (t), while the vertical axis of each timing diagram corresponds to a level/value of the respective signal/current. As used in the timing diagrams and applied to the signals output from cycle setter 10, as described above, a solid line illustrates that the signal is being output from the cycle setter 10, while a dashed line illustrates that the signal is not being output from the cycle setter 10.

Figure 3A:
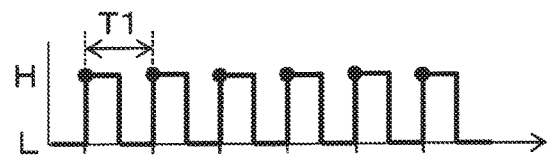
FIG. 3A illustrates a timing diagram of a first reference signal.
Figure 3B:
FIG. 3B illustrates a timing diagram of a second reference signal.

FIGS. 3A, 3B, 3C, 3D in combination, illustrate a timing diagram of the first reference signal S1, the second reference signal S2, the load current IL, and the drive signal Sd that is generated based on the first reference cycle T1 of the first reference signal S1. As shown in FIGS. 3A and 3B, the first reference signal S1 in FIG. 3A is shown as a solid line, where the second reference signal S2 in FIG. 3B is shown as a dashed line. Following this convention, the switch 9, as described above, is positioned to output the first reference signal S1 from the cycle setter 10, while the second reference signal S2 (as shown by a dashed line) is not output from the cycle setter 10.

Figure 4A:
FIG. 4A illustrates a timing diagram of a first reference signal.
Figure 4B:
FIG. 4B illustrates a timing diagram of a second reference signal.

FIGS. 4A, 4B, 4C, 4D illustrate a timing diagram of the first reference signal S1, the second reference signal S2, the load current IL, and the drive signal Sd generated based on both the first reference cycle T1 of the first reference signal S1 and the second reference cycle T2 of the second reference signal S2. As shown in FIGS. 4A and 4B, the cycle setter 10 begins by outputting the first reference signal S1 with the first reference cycle T1 and not outputting the second reference signal S2 with reference cycle T2. As time progresses, the switch 9 receives switch signal Sc causing the switch 9 to switch (i.e., reposition) to change the output from cycle setter 10 from the first reference signal circuit 11 to the second reference signal circuit 12. At the time of switching, the cycle setter 10 stops outputting the first reference signal S1 (shown after switching as a dashed line) and starts outputting the second reference signal S2 (shown after switching as a solid line).

FIGS. 5A, 5B, 5C, 5D illustrate a timing diagram of the first reference signal S1, the second reference signal S2, the load current IL, and the drive signal Sd generated based on both the second reference cycle T2 of the second reference signal S2 and the first reference cycle T1 of the first reference signal S1. As shown in FIGS. 5A and 5B, the cycle setter 10 begins by outputting the second reference signal S2 with the second reference cycle T2 and not outputting the first reference signal S1 with the first reference cycle T1. As time progresses, the switch 9 receives switch signal Sc causing the switch 9 to switch (i.e., reposition) to change the output from cycle setter 10 from the second reference signal circuit 12 to the first reference signal circuit 11. At the time of switching, the cycle setter 10 stops outputting the second reference signal S2 (shown after switching as a dashed line) and starts outputting the first reference signal S1 (shown after switching as a solid line). As described in further detail below, the operation of the load driving apparatus 1 may change, and be described in terms of state (a), state (b), and state (c).

The operational states described below are additionally described in terms of supplying and not supplying the forward load current IL from the full-bridge circuit 3 to the load 2, i.e., as switching between a supply state and a non-supply state of the load current IL, which may read as POWER-SUPPLY STATE and NON-POWER-SUPPLY STATE, and indicated as PW SUP and NON SUP in the drawings. As described herein, calculator 5 may be described as supplying power to the load 2, meaning that the calculator 5 may be outputting a drive signal Sd to the MOSFETs 4a-4d in the full-bridge circuit 3 to switch the MOSFETs 4a-4d to supply power to the load 2.

Though the above states supplying/not supplying the forward load current IL, the load current IL in the reverse direction is performed by the same control, and thus the control of the reverse load current IL is "symmetric" to the control of the forward load current. As such, the control of the reverse load current IL is omitted for brevity. However, as described herein, operation of the calculator 5 supplying a drive signal Sd to the full-bridge circuit 3 may imply controlling the MOSFETs 4a-4d to supply a forward current, a reverse current, or both a forward and reverse current.

(a) Drive Control Using the First Reference Cycle T1

When the load driving apparatus 1 begins supplying power to load 2, the switch 9 is in a first position that provides a connection to the first reference signal circuit 11. The first reference signal S1 with the first reference cycle T1 is input to the calculator 5. With reference to FIG. 2, positioning the switch 9 to the first position is the process described at A1. The calculator 5, upon receiving a drive start signal, detects a rising edge of the first reference signal S1 with the first reference cycle T1. The drive start signal is different than the first reference signal S1 and the second reference signal S2 and used to signal the start of power supply from the MOSFETs 4a-4d. With reference to FIG. 2, the process of detecting the rising edge is shown at A2.

Figure 3C:
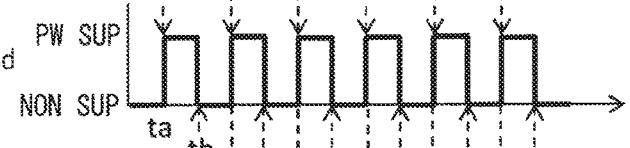
FIG. 3C illustrates a timing diagram of a drive signal.

The calculator 5 detects the rising edge of the first reference signal S1 at time ta shown in FIG. 3C, and outputs the drive signal Sd to each of the MOSFETs 4a-4d of the full-bridge circuit 3 to switch each of the MOSFETs 4a-4d to a power supply state, PW SUP as shown in FIG. 3C.

With reference to FIG. 2, as the switch 9 is positioned to output the first reference signal S1 with the first reference cycle T1 at A1 and the rising edge of the first reference signal S1 is detected by the calculator 5 at A2, the operation process continues to A5 where calculator 5 outputs the drive signal Sd to the MOSFETs 4a-4d to begin supplying power from the bridge circuit 3 to the load 2.

In such case, for supplying the forward load current IL to the load 2, the calculator 5 outputs the drive signal Sd that drives an ON operation of the MOSFETs 4a and 4d, and an OFF operation of the MOSFETs 4b and 4c. For the supply of the reverse load current IL to the load 2, the drive signal Sd drives the OFF operation of the MOSFETs 4a and 4d, and the ON operation of the MOSFETs 4b and 4c. The calculator 5 drives the OFF operation of all the MOSFETs 4a-4d to stop supplying power from the bridge circuit 3 to the load 2.

The load current IL measured at the load 2 is equal to the load current IL measured by the current sensing resistor 6. The current sensing resistor 6 outputs a voltage signal relative to the load current IL sensed by the current sensing resistor 6, and the voltage signal from the current sensing resistor 6 is input to the load current detector 7. In other words, the terminal voltage of the current sensing resistor 6 may be used by the load current detector 7 to determine a value of the load current IL.

Based on the voltage signal output from the current sensing resistor 6 to determine the load current IL, the load current detector 7 compares the load current IL to a predetermined threshold current Ith. When the load current IL reaches an upper limit value, i.e. the predetermined current threshold Ith, the load current detector 7 outputs a detection signal Sp to the calculator 5.

The terminal voltage of the current sensing resistor 6 is also input to the cycle state detector 8. The cycle state detector 8 compares the level of the load current IL to the current position of the switch. That is, the cycle state detector determines whether the current position of the switch is outputting either the first reference signal S1 with the first reference cycle T1 or the second reference signal S2 with the second reference cycle T2. For example, the cycle state detector 8 may change the reference cycle from the first reference cycle T1 to the second reference cycle T2 when the load current IL does not reach the predetermined threshold current Ith within each cycle of the first reference cycle T1. The cycle state detector 8 may change from the second reference cycle T2 to the first reference cycle T1 when the load current IL reaches the threshold current level Ith within each cycle of the second reference cycle T2. The cycle state detector 8 outputs a switch signal Sc based on a comparison between the level of the load current IL and the state of the reference cycle T1 or T2 currently outputted from the cycle setter 10.

When the forward load current is set to be supplied to the load 2 by the MOSFETs 4a and 4d, as described above, the calculator detects the leading edge of the first reference signal S1, and upon detecting the leading edge of the first reference signal S1, outputs a drive signal Sd to the MOSFETs 4a and 4d to supply the forward load current IL to the load 2. While the forward load current IL is being supplied to the load 2, the forward load current IL level rises and is detected by the load current detector 7. The forward load current IL level rises until reaching a predetermined current threshold Ith.

Figure 3D:
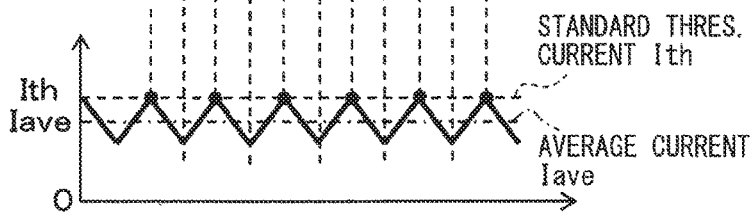
FIG. 3D illustrates a timing diagram of a load current waveform.

Then, when the load current detector 7 determines that the forward load current IL level is at or exceeding the predetermined current threshold Ith, as shown at time tb in FIGS. 3C and 3D, the load current detector 7 outputs a detection signal Sp to the calculator 5. Upon receiving the detection signal Sp, the calculator 5 stops the output of the drive signal Sd to the MOSFETs 4a and 4d and the drive signal switches from the drive state, i.e. PW SUP in FIG. 3C, to the non-drive state, i.e. NON SUP in FIG. 3C. At the start of the non-drive state, the forward load current IL level falls gradually from the predetermined current threshold, as shown in FIG. 3D. The forward load current IL continues to fall until the calculator 5 detects the leading edge of the first reference signal S1, which triggers the output of the drive signal Sd from the calculator 5 to the MOSFETs 4a and 4d, and the cycle starts again. The periodic rise and fall of the load current IL level from low point to low point, as shown in FIG. 3D, corresponds to the first reference cycle T1, as shown in FIG. 3A.

Hereafter, just like the above, when the rising edge of the first reference cycle signal S1 is detected, the calculator 5 outputs the drive signal Sd to each of the MOSFETs 4a-4d of the full-bridge circuit 3, and switches the MOSFETs 4a-4d to the power supply state to supply both forward and reverse current to load 2.

The calculator 5 repeats the above, that is, controlling the supply of the drive signal Sd to the MOSFETs 4a-4d to control the drive of the load 2 using the first reference signal S1 with the first reference cycle T1.

(b) Drive Control by Switching from the First Reference Cycle T1 to the Second Reference Cycle T2

As described above, an increase in temperature may affect load 2. An increase in temperature on load 2 may cause an increase of the electrical resistance in the windings of load 2. Increased resistance in the windings of load 2 hinders the flow of current through the windings of load 2, and thus delays the rise of the load current in load 2, i.e., the rise of the load current slows. Such a situation is described with reference to FIGS. 4A to 4D.

Figure 4C:
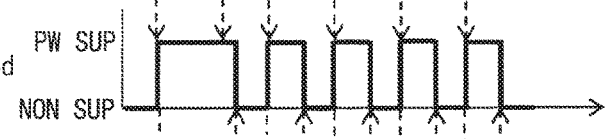
FIG. 4C illustrates a timing diagram of a drive signal.

When the resistance factor of the windings increases with the rise of temperature, the calculator 5 will detect the rising edge of the next pulse in the first reference signal S1 before the load current IL reaches the threshold current Ith, that is, when calculator 5 is outputting the drive signal Sd to the full-bridge circuit 3 to supply power to load 2, i.e. the PW SUP state, as shown in FIGS. 4A and 4C. In other words, when the rise of the load current slows, the first reference cycle T1 of the first reference signal S1 is such that the rising edge of a next pulse in the periodic first reference signal S1 is detected by the calculator 5 before the load current detector 7 can detect the load current IL reaching the predetermined current threshold Ith to output the detection signal Sp to the calculator 5 to stop the output of the drive signal Sd. Stated another way, the load current IL does not reach the predetermined threshold current value Ith within the first reference cycle T1.

That is, with reference to FIG. 2, described above is a situation, in which, after performing A2, A5, A6, and A7 to put the full-bridge circuit 3 in the power supply state, in waiting for YES in at A3 while the processes A2-A4 repeat, YES at A2 is satisfied prior to YES at A3.

In such case, the calculator 5 continues the output of the drive signal Sd to the full-bridge circuit 3 to continue the power supply state (i.e. full-bridge circuit 3 supplying power to the load 2). With continued reference to FIG. 2, when full-bridge circuit 3 is supplying power to the load 2, the branch at A5 is "YES," and the process proceeds further to A9 and A10.

At such moment, the operation controlled using the first reference signal S1 with the first reference cycle T1 is switched so that the operation is controlled by the second reference signal S2 with the second reference cycle T2, as shown in FIG. 4B. In other words, with reference to FIGS. 4A and 4B, the operation is first controlled using the first reference signal S1, as shown by a solid line in FIG. 4A, during which the second reference signal S2 has no control of the operation and is shown first as a dashed line in FIG. 4B. Thereafter, the switch 9 switches position so that the output of the second reference circuit 12 is output from the cycle selector 10 and the output from the first reference circuit 11 ceases. Then, the operation is controlled using the second reference signal S2, as shown by a solid line in FIG. 4B, and the first reference signal S1 no longer controls, as shown by a dashed line in FIG. 4A.

The switching described above is performed by (i) detecting such a state by the cycle state detector 8 and then outputting the switch signal Sc to the switch 9 to switch (i.e. change position of the switch 9) from a connection to the first reference circuit 11 to a connection to the second reference circuit 12.

After switching to output the second reference signal S2 from the second reference circuit 12, the calculator 5 is set to perform the subsequent signal generation operation for generating the drive signals Sd based on the second reference signal S2 with the second reference cycle T2.

Figure 4D:
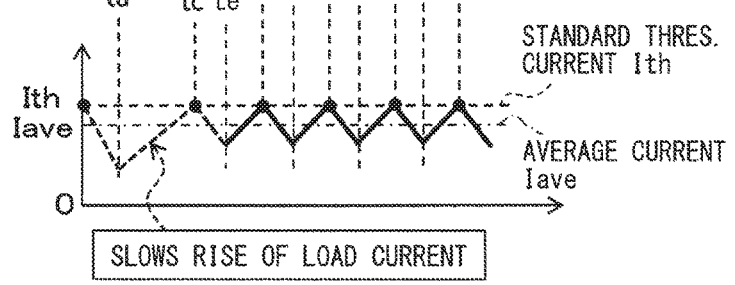
FIG. 4D illustrates a timing diagram of a load current waveform.

Returning to the condition where the switch 9 is positioned to output the first reference signal S1 to calculator 5 and the cycle state detector 8, and with reference to FIG. 2, the processes at A2-A4 repeat until the load current IL reaches the predetermined threshold current Ith at time tc, as shown in FIG. 4D. At time tc, the calculator 5 switches from supplying the drive signal to the bridge circuit 3, i.e. PW SUP, to the non-supply state NON SUP, as shown in FIG. 4C, so that bridge circuit 3 does not supply power to load 2.

With reference to FIG. 2, the process of detecting the load current IL at a point where the load current IL is equal to or greater than the predetermined threshold current Ith, corresponds to YES in A3, and the process of switching from a power supply to a non-supply state is shown at A8.

When the switch 9 is positioned to output the second reference signal S2 with the second reference cycle T2 from the second reference circuit 12, the rising edge of signal S2 is detected earlier by calculator 5 than the rising edge of the reference signal S1 would have been detected before the switching occurred. At such time, the calculator 5 switches the full-bridge circuit 3 to the power supply state by providing a drive signal Sd to the full-bridge circuit 3.

With reference to FIG. 2, the operation of the load driving apparatus 1 described above corresponds to a sequence of YES at A2, NO at A5, NO at A6, and NO at A11, before finally switching to the power supply state at A7.

Hereafter, as described above, when the rising edge of the second reference signal S2 with the second reference cycle T2 is detected, the calculator 5 outputs the drive signal Sd to each of the MOSFETs 4a-4d in the full-bridge circuit 3, and switches the MOSFETs 4a-4d to the power supply state.

When the load current IL reaches the predetermined threshold current Ith and the load current detector 7 outputs the detection signal Sp to the calculator 5, the calculator 5, upon receiving the detection signal Sp, stops the supply of the drive signal Sd to the full-bridge circuit 3 for performing the ON operation of the MOSFETs 4a and 4d, to put the MOSFETs 4a and 4d in the non-supply state. By repeating such control, the calculator 5 performs the drive control of the load 2 based on the second reference cycle T2.

In such manner, even when the resistance factor of the load 2 increases due to rising temperatures, by changing the control cycle so that the drive signal Sd is output based on the second reference cycle T2, the drive control of the load 2 is performed without large fluctuations of the load current IL away from the average current Iave. In other words, by switching the cycle setter 10 to output the second reference signal S2 with the second reference cycle T2, the drive signal Sd based on the second reference signals controls the load 2 such that there are no large deviations of the load current IL from the average current Iave. Unlike the control operation realized during a rise in temperature where the first reference signal S1 with the first reference cycle T1 is used, by using the second reference signal S2 to set the drive signal Sd large fluctuations of the load current IL are prevented.

(c) Drive Control by Switching from the Second Reference Cycle T2 to the First Reference Cycle T1

When the drive signal Sd to control power supply to the load 2 is based on the second reference signal S2 with the second reference cycle T2, as the temperature of the load 2 falls, the resistance factor of the coil also decreases, thereby quickening the rise of the load current IL. Such a situation is described with reference to FIGS. 5A to 5D.

When the resistance factor of the winding in load 2 decreases due to falling temperatures, the rise of the load current IL is quicker, and thus the load current IL reaches the predetermined current threshold Ith more quickly. By basing the drive signal Sd on the second reference signal S2 with the second reference cycle T2, the rise of load current during falling temperatures is so quick, that the power supply state PW SUP is shortened and the drive signal Sd pulses become shorter and less periodic compared to the constant cycle and pulse width of the second reference signal S2, as shown in FIGS. 5B, 5C, and 5D. The load current detector 7 detects that the load current IL is reaching the predetermined current threshold Ith within the second reference cycle T2 of the second reference signal S2.

With reference to FIG. 2, the calculator 5, satisfying YES at A3 and switching to the non-power supply state NON SUP at A8, switches the power supply state to the full-bridge circuit 3 to the non-supply state as shown in FIG. 5D.

As a result, since the calculator 5 is in the non-supply state when detecting the rising edge of the second reference signal S2 with the second reference cycle T2, the calculator 5 performs the processes at A2, A5, and at A6, determined as NO, continues to proceed to A11, and, due to the upper limit value determination (i.e. the load current IL≥the predetermined threshold current Ith) within the second reference cycle 12, switches from the second reference cycle signal S2 to the first reference cycle signal S in Step A12.

The switching of the cycle is performed by outputting the switch signal Sc from the cycle state detector 8 to the switch 9 to switch (i.e. reposition) the connection from the second reference circuit 12 to the first reference circuit 11.

After switching from the second reference circuit 12 to the first reference circuit 11, the calculator 5 is set to output the drive signal Sd based on the first reference cycle signal S again.

Hereafter, just like the above, when the rising edge of the first reference cycle signal S1 is detected, the calculator 5 outputs the drive signal Sd to each of the MOSFETs 4a-4d of the full-bridge circuit 3, and switches the MOSFETs 4a-4d to the power supply state.

Further, when the load current IL reaches the predetermined threshold current Ith and the load current detector 7 outputs the detection signal Sp to calculator 5, the calculator 5 stops the supply of the drive signal Sd to the full-bridge circuit 3 to perform the ON operation of the MOSFETs 4a and 4d, and puts the MOSFETs 4a and 4d in the non-supply state. By repeating the above control, the calculator 5 performs the drive control of the load 2 based on the first reference cycle T1.

In such manner, the output of the drive signal Sd based on the second reference cycle T2 due to the temperature rise, and the output of the drive signal Sd based on the first reference cycle T1 due to the temperature fall, enables a stable drive control by preventing the fluctuation of the load current IL, i.e., controlling the load current IL substantially at a level around the average current Iave, just like the situation under case (b) described above.

According to the present embodiment described above, the cycle setter 10 is capable of outputting the signals S1 with the first reference cycle T1 and the signal S2 with the second reference cycle T2, and the cycle state detector 8 is used to switch between the cycles T1 and T2 based on a determination of the load current IL and the cycle state.

Thereby, even when the resistance factor fluctuates due to the temperature change of the load 2 or the like, the change of the average current Iave of the load current IL is prevented by appropriately switching between the first reference cycle T1 and the second reference cycle T2, for the drive control of the full-bridge circuit 3.

Thus, without using a complex configuration, the cycle of the load current IL can be changed to enable stable control of the load 2 and to prevent a deterioration of load control accuracy by the drive control of the load control apparatus 1.

Second Embodiment

FIGS. 6 and 7A-7D show the second embodiment of the present disclosure, and illustrate difference from the first embodiment.

In the present embodiment, the predetermined threshold current Ith, which is used to determine the load current IL in the first embodiment, is designated as an upper limit threshold current Ith1, and a threshold for setting a lower limit of the load current IL is provided as a lower limit threshold current Ith2.

Figure 6:
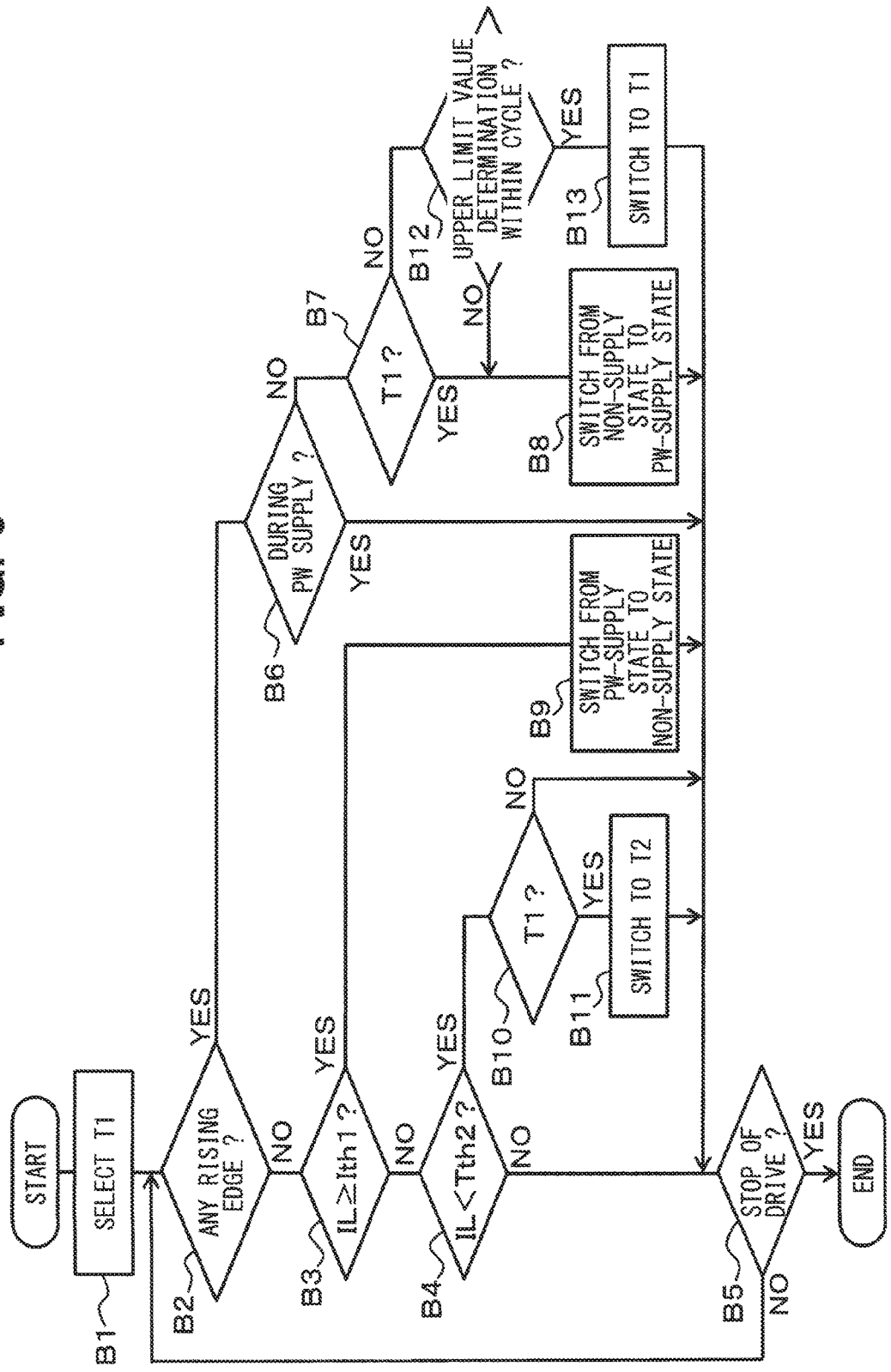
FIG. 6 illustrates a flowchart of the power supply control in a second embodiment of the present disclosure.

The load current detector 7 outputs the detection signal Sp when the load current IL reaches the upper limit threshold current Ith1, i.e., upon determining that the upper limit value has been reached, and outputs the detection signal Sp when the load current IL reaches (i.e., falls below) the lower limit threshold current Ith2, i.e., upon determining that the lower limit value has been reached. FIG. 6 is a flowchart of an operation of the controller 13, and FIGS. 7A to 7D are timing charts that show the drive control by switching from the first reference cycle T1 to the second reference cycle 12, which correspond to FIGS. 4A to 4D in the first embodiment.

Note that, in FIG. 6, the processes at B1 to B5 are basically same as the processes at A1 to A4 of the first embodiment, with an addition of process B4 which is a determination of whether the load current IL has fallen below the lower limit threshold current Ith2. Process B4 is for determining whether to switch from the first reference cycle T1 to the second reference cycle T2, and, YES branch of process B4 leads to the switching process at B11.

Although in the first embodiment, a sequence of the rising edge detection by YES in process A2 and a determination that the power supply was in the power supply state (i.e., PW SUP) by YES at process A5 returns to process A4 after determining whether to switch to T2 or not, as determined at A9, a corresponding sequence of processes from B2 to B6 in the present embodiment returns to process B5 without making such determination, that is, the process returns directly to B5 without determining whether to switch from the first reference cycle T1 to the second reference cycle T2.

The flow in FIG. 6 starts with an operation of the calculator 5 for detecting the rising edge of the first reference cycle signal S1 by going through the processes at B1 to B5. After detecting the rising edge of S1, the calculator 5 goes through NO at B6 and YES at B7 to start the power supply to the full-bridge circuit 3 at B8.

Further, when it is determined that the load current IL has reached the upper limit threshold current Ith1, i.e., determining the upper limit value of IL has been reached, while performing the processes at B2-B5, the calculator 5 switches the power supply state of the full-bridge circuit 3 to the non-supply state by branching to YES at B3.

Then, the processing described above repeats and is performed again.

When the resistance factor increases due to the temperature of the load 2, the rise of the load current IL slows as shown in FIG. 7D, and the lower value of the load current IL rises to be above the lower limit current threshold Ith2.

The calculator 5 receives the detection signal Sp from the load current detector 7 due to the load current IL falling below the lower limit threshold current Ith2, before the calculator 5 detects the rising edge of the signal S1 with the first reference cycle T1 (i.e., before time ta arrives).

Therefore, with reference to FIG. 6, the calculator 5 proceeds to YES at B4, and switches from the first reference cycle T1 to the second reference cycle T2 by performing the processes at B10 and B11, as shown in FIGS. 7A and 7B.

Thus, the calculator 5 subsequently generates the drive signals Sd based on the signal S2 with the second reference cycle T2, as shown in FIG. 7C.

Subsequently, operations are the same as the first embodiment. That is, when the rising edge of the second reference cycle signal S2 is detected, the calculator 5 provides the drive signal Sd to each of the MOSFETs 4a-4d of the full-bridge circuit 3, and switches each of the MOSFETs 4a-4d to the power supply state. When the load current IL reaches the predetermined upper limit threshold current Ith, i.e. Ith1, as described with respect to the second embodiment, and the load current detector outputs a detection signal Sp to the calculator 5, the calculator 5 stops the drive signal Sd for performing the ON operation of the MOSFETs 4a and 4d of the full-bridge circuit 3, and puts the MOSFETs 4a and 4d in the non-supply state.

The calculator 5 performs the drive control of the load 2 based on the second reference cycle T2 by repeating the above-described control.

In such manner, even when the resistance factor of the load 2 is increasing due to a rise in temperature, the drive control is performed without a large fluctuation of the load current IL from the average current Iave, by switching the output of the cycle setter 10 to change the drive signal Sd based on the first reference cycle T1 to a drive signal Sd based on the second reference cycle T2.

When the resistance factor decreases due to a fall in temperature at the load 2 and the rise time of the load current IL is quickened when the calculator is outputting a drive signal Sd based on the second reference cycle T2, the same operation as the one under item (c) in the first embodiment is performed.

Therefore, the same operation effects as the first embodiment are achievable by the second embodiment.

OTHER EMBODIMENTS

The present disclosure is not limited only to the above-mentioned embodiments, but may also be implemented in various forms as discussed in further detail below.

That is, for example, the configuration using the full-bridge circuit 3 as a drive circuit in the above-mentioned embodiments may be modified to the other forms of drive circuits, such as using a half-bridge circuit for the power supply to the load 2, using one switching element for the power supply to the load 2, or the like.

The current sensing resistor 6 configured to detect both of the forward current and the reverse current in the above embodiment may be changed to the use of two separate current sensing resistors that respectively detect the forward current and the reverse current in the full-bridge circuit 3.

The above-mentioned examples about using two reference signals S1 and S2, each having a different reference cycle T1 and T2, respectively, may be changed to use three of more reference signals with each having a different reference cycle, and switching among them to realize an appropriate control state.

The second reference cycle T2 set as one half length of the first reference cycles T1 may be changed to another length, as long as the second reference cycle T2 is a cycle shorter than the first reference cycle T1.

The load 2 described above as a stepper motor may be changed to other motors, or may be changed to other inductive loads as well.

The drive control provided by the components of the controller 13 may be changed to another configuration such as a software driven control, for example, using a microcomputer or the like disposed in the controller 13.

Although the present disclosure has been fully described in connection with the above-described embodiment with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A load driving apparatus comprising:
   a driver circuit disposed in a power supply path to a load and configured to supply power to the load;
   a current detector configured to detect a value of a load current;
   a switch configured to switch between a first reference circuit configured to output a first reference signal with a first reference cycle and a second reference circuit configured to output a second reference signal with a second reference cycle; and
   a controller configured to
      (i) control a supply of an electric power from the driver circuit to the load using either of the first reference signal or the second reference signal, and
      (ii) (a) stop the supply of the electric power from the driver circuit to the load or
      (ii) (b) supply a reverse current from the driver circuit to the load when the value of the load current detected by the current detector is equal to or greater than a value of a predetermined threshold current, wherein
   the controller is configured to control the switch and switch between the first reference circuit and the second reference circuit based on a rising value of the load current detected by the current detector, and wherein
   both the first reference signal with the first reference cycle and the second reference signal with the second reference cycle have a constant frequency.

2. The load driving apparatus of claim 1, wherein
the second reference cycle is shorter than the first reference cycle, and wherein
the controller controls the switch to switch from the first reference circuit outputting the first reference signal with the first reference cycle to the second reference circuit outputting the second reference signal with the second reference cycle when the value of the load current does not rise to the value of the predetermined threshold current within the first reference cycle.

3. The load driving apparatus of claim 1, wherein
the second reference cycle is set to be shorter than the first reference cycle, and wherein
the controller controls the switch to switch from the first reference circuit outputting the first reference signal with the first reference cycle to the second reference circuit outputting the second reference signal with the second reference cycle when the value of the load current does not fall to a value of a predetermined lower limit threshold current within the first reference cycle, and wherein
the value of the predetermined lower limit threshold current is a lower value than a value of a predetermined upper limit threshold current.

4. The load driving apparatus of claim 2, wherein
the controller controls the switch to switch from the second reference circuit outputting the second reference signal with the second reference cycle to the first reference circuit outputting the first reference signal with the first reference cycle when the value of the load current rises to the value of the predetermined threshold current within the second reference cycle.

5. The load driving apparatus of claim 1, wherein
the second reference signal has a higher frequency than the first reference signal.

6. The load driving apparatus of claim 1, wherein
the driver circuit includes a bridge circuit having at least two pairs of switching elements, a pair of switching elements including a high side switching element and a low side switching element.

7. A load driving apparatus comprising:
a driver circuit disposed in a power supply path to a load and configured to supply power to the load;
a current detector configured to detect a value of a load current;
a switch configured to switch between a first reference circuit configured to output a first reference signal with a first reference cycle and a second reference circuit configured to output a second reference signal with a second reference cycle; and
a controller configured to
  (i) control a supply of an electric power from the driver circuit to the load using either of the first reference signal or the second reference signal, and
  (ii) (a) stop the supply of the electric power from the driver circuit to the load or
  (ii) (b) supply a reverse current from the driver circuit to the load when the value of the load current detected by the current detector is equal to or greater than a value of a predetermined threshold current, wherein
the second reference cycle is shorter than the first reference cycle, and wherein
the controller is further configured to control the switch and
to switch between the first reference circuit and the second reference circuit based on a rising value of the load current detected by the current detector, and
to switch from the first reference circuit outputting the first reference signal with the first reference cycle to the second reference circuit outputting the second reference signal with the second reference cycle in response to the load current not rising to the value of the predetermined threshold current within the first reference cycle.

* * * * *